(12) United States Patent
Moran et al.

(10) Patent No.: US 11,623,600 B2
(45) Date of Patent: Apr. 11, 2023

(54) APPARATUS FOR COVERING A WINDSHIELD OPENING OF A VEHICLE

(71) Applicant: ZF Passive Safety Systems US Inc., Washington, MI (US)

(72) Inventors: Dylan Moran, Rochester Hills, MI (US); Ali Emambakhsh, Rochester, MI (US); Joseph Popek, Shelby Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/382,116

(22) Filed: Jul. 21, 2021

(65) Prior Publication Data

US 2023/0027656 A1 Jan. 26, 2023

(51) Int. Cl.
*B60R 21/232* (2011.01)
*B60R 21/213* (2011.01)
*B60R 21/239* (2006.01)
*B60R 21/231* (2011.01)
*B60R 21/26* (2011.01)

(52) U.S. Cl.
CPC .......... *B60R 21/232* (2013.01); *B60R 21/213* (2013.01); *B60R 21/239* (2013.01); *B60R 21/26* (2013.01); *B60R 2021/23107* (2013.01)

(58) Field of Classification Search
CPC . B60R 21/232; B60R 21/213; B60R 21/2334; B60R 21/214; B60R 21/08; B60R 21/06; B60R 2021/161
See application file for complete search history.

(56) References Cited

U.S. PATENT DOCUMENTS

| | | | | |
|---|---|---|---|---|
| 6,932,380 | B2 * | 8/2005 | Choi | B60R 21/232 280/730.1 |
| 7,360,790 | B2 * | 4/2008 | Hasebe | B60R 21/2338 280/743.2 |
| 7,922,193 | B2 * | 4/2011 | Breuninger | B60R 21/2338 280/730.2 |
| 8,328,228 | B2 * | 12/2012 | Lee | B60R 21/214 280/743.1 |
| 9,446,733 | B2 * | 9/2016 | Pausch | B60R 21/2334 |
| 9,771,049 | B2 * | 9/2017 | Lee | B60R 21/232 |
| 10,343,641 | B2 * | 7/2019 | Abramoski | B60R 21/231 |
| 10,369,951 | B2 * | 8/2019 | Tabushi | B60R 21/0136 |

(Continued)

*Primary Examiner* — Paul N Dickson
*Assistant Examiner* — Tiffany L Webb
(74) *Attorney, Agent, or Firm* — Tarolli, Sundheim, Covell & Tummiino LLP

(57) ABSTRACT

In one aspect, an apparatus for helping to protect an occupant of a vehicle includes a frontal curtain airbag. The airbag has overlying panels that are interconnected. The airbag is deployable a deployed condition in which the airbag spans across a width of a windshield opening of the vehicle. A restraining panel is separate from and extends widthwise over the panels of the airbag. The restraining panel is connected to the airbag and has a width configured to cause opposing end portions of the deployed airbag to be bent toward one another and into a curved configuration. Pressurization in the deploying airbag tensions the restraining panel widthwise. The tensioned restraining panel maintains the bend in the deploying airbag so that an effective airbag depth is measured between the restraining panel and the airbag.

16 Claims, 7 Drawing Sheets

(56) References Cited

U.S. PATENT DOCUMENTS

| | | |
|---|---|---|
| 10,654,439 B2 * | 5/2020 | Kitagawa .............. B60R 21/237 |
| 10,682,973 B2 * | 6/2020 | Kitagawa .............. B60R 21/206 |
| 10,730,472 B2 | 8/2020 | Perez |
| 11,059,448 B2 * | 7/2021 | Rutelin ................ B60R 21/216 |

* cited by examiner

APPARATUS FOR COVERING A WINDSHIELD OPENING OF A VEHICLE

FIELD OF THE INVENTION

The invention relates to an apparatus for helping to protect an occupant of a vehicle. More particularly, the invention relates to an airbag inflatable between a portion of a vehicle and a vehicle occupant. In one configuration, the invention relates to an airbag inflatable to cover a windshield opening of a vehicle for protecting a front seat vehicle occupant.

BACKGROUND OF THE INVENTION

It is known to provide an inflatable vehicle occupant protection device, such as an airbag, for helping to protect an occupant of a vehicle. Airbags are inflatable between a portion of the vehicle and a vehicle occupant. One particular type of airbag is a frontal airbag inflatable between an occupant of a front seat of the vehicle and an instrument panel of the vehicle. Such airbags can be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag cover is connectable with the housing and/or instrument panel to help enclose and conceal the airbag in a stored condition. Upon deployment of the passenger airbag, the airbag cover opens to permit the airbag to move to an inflated position. The airbag cover opens as a result of forces exerted on the cover by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated position. The airbag cover opens as a result of forces exerted on the cover by the inflating driver airbag.

Known frontal airbags thus rely on the instrument panel and instrument panel-adjacent structures, such as the steering wheel, for providing a storage location and a reaction surface for occupant protection and ejection mitigation in the event of a frontal crash. In certain vehicle configurations, such as in driverless, autonomous, semi-autonomous, automated, and/or semi-automated vehicles, the instrument panel may be designed in a manner that reduces its functionality as an airbag storage location and/or as a reaction surface. In such vehicle configurations, it may be desirable to store the frontal airbags in a different location within the vehicle. For example, it may be desirable to store the frontal airbags adjacent the roof of the vehicle so that the frontal airbags may deploy downward from the roof of the vehicle to cover at least a portion of the windshield opening, while at least the windshield provides a reaction surface for the deployed frontal airbags. Conventional frontal airbags, however, are not configured to deploy from the roof downward. Further, conventional frontal airbags may not be designed to adequately cover the width of windshield opening when deploying from the roof.

SUMMARY OF THE INVENTION

According to one aspect, an apparatus for helping to protect an occupant of a vehicle comprises a frontal curtain airbag. The frontal curtain airbag has overlying panels interconnected to form a perimeter connection that extends along a perimeter of the panels and interior connections within the perimeter. The perimeter connection and the interior connections define inflatable chambers of the frontal curtain airbag. The frontal curtain airbag is deployable from a stored condition adjacent a roof of the vehicle down to a deployed condition in which the frontal curtain airbag spans across a width of a windshield opening of the vehicle. A restraining panel is separate from and extends widthwise over the panels of the frontal curtain airbag. The restraining panel is connected to the frontal curtain airbag and has a width configured to cause opposing end portions of the deployed frontal curtain airbag to be bent toward one another and into a curved configuration. Pressurization in the deploying frontal curtain airbag tensions the restraining panel widthwise. The tensioned restraining panel maintains the bend in the deploying frontal curtain airbag so that an effective airbag depth is measured between the restraining panel and the frontal curtain airbag.

According to another aspect, alone or in combination with any other aspect, the width of the restraining panel can be less than a width of the frontal curtain airbag in a flattened condition. The width differential can cause the opposing end portions of the deployed frontal curtain airbag to be bent toward one another and into the curved configuration.

According to another aspect, alone or in combination with any other aspect, the width of the frontal curtain airbag in the flattened condition can be greater than the width of the windshield opening.

According to another aspect, alone or in combination with any other aspect, heights of the restraining panel and the frontal curtain airbag can be configured to cover a height of the windshield opening and adjacent vehicle structures that are vertically below the windshield opening.

According to another aspect, alone or in combination with any other aspect, the restraining panel can have an upper portion and a lower portion that extends below the upper portion. The lower portion of the restraining panel can extend further downward than a lower portion of the frontal curtain airbag when the frontal curtain airbag is in the deployed condition.

According to another aspect, alone or in combination with any other aspect, the frontal curtain airbag and the restraining panel can span widthwise from A-pillar to A-pillar to cover the windshield opening on both driver and passenger sides of the vehicle.

According to another aspect, alone or in combination with any other aspect, the frontal curtain airbag and the restraining panel can span widthwise from an A-pillar to a vehicle centerline to cover the windshield opening on a driver or passenger side of the vehicle.

According to another aspect, alone or in combination with any other aspect, in the deployed condition of the frontal curtain airbag, a central portion of the frontal curtain airbag can be positioned adjacent the windshield opening, and the restraining panel can be spaced from the windshield opening by the frontal curtain airbag and presented facing the occupant for occupant engagement.

According to another aspect, alone or in combination with any other aspect, in the deployed condition of the frontal curtain airbag, the restraining panel can be positioned adjacent the windshield opening, and the frontal curtain airbag can curve in a rearward direction away from the windshield opening toward the occupant for occupant engagement.

According to another aspect, alone or in combination with any other aspect, the restraining panel can have first and second end portions spaced widthwise from one another and a central portion positioned centrally between the first and second end portions of the restraining panel. The frontal curtain airbag can comprise a first airbag portion comprising a plurality of chambers that cover a first portion of the width of the windshield opening and a second airbag portion comprising a plurality of chambers that cover a second portion of the windshield opening. The first and second portions can be fluidly connected to each other. The first airbag portion can have a first end portion connected to the first end portion of the restraining panel and an opposite second end portion connected to the central portion of the restraining panel. The second airbag portion can have a first end portion connected to the second end portion of the restraining panel and an opposite second end portion connected to the central portion of the restraining panel. The width of the restraining panel between the first end portion and the central portion can be configured to cause the first and second end portions of the first airbag portion to be bent toward one another and into a curved configuration when the frontal curtain airbag is inflated and deployed. The width of the restraining panel between the second end portion and the central portion can be configured to cause the first and second end portions of the second airbag portion to be bent toward one another and into a curved configuration when the frontal curtain airbag is inflated and deployed.

According to another aspect, alone or in combination with any other aspect, pressurization of the first and second airbag portions can tension the restraining panel widthwise. The tensioned restraining panel can maintain the bends in the first and airbag portions so that the effective depth of the first and second airbag portions can be measured between the restraining panel and the first and second airbag portions.

According to another aspect, alone or in combination with any other aspect, the second end portion of the first airbag portion can be separated and spaced from the first end portion of the second airbag portion.

According to another aspect, alone or in combination with any other aspect, the second end portion of the first airbag portion can be connected to the first end portion of the second end portion by an uninflated portion of the frontal curtain airbag.

According to another aspect, alone or in combination with any other aspect, an airbag module can comprise the apparatus and an inflator. The inflator can be operably connected to both the first and second airbag portions for inflating and deploying the first and second airbag portions from the stored condition to the deployed condition.

According to another aspect, alone or in combination with any other aspect, the inflatable chambers can vary in size.

According to another aspect, alone or in combination with any other aspect, the frontal curtain airbag can include an active or passive vent for releasing inflation fluid from the frontal curtain airbag.

According to another aspect, alone or in combination with any other aspect, in the stored condition, the frontal curtain airbag can be rolled and/or folded and positioned between the vehicle roof and a vehicle headliner.

According to another aspect, alone or in combination with any other aspect, an airbag module can comprise the apparatus and an inflator. The inflator can be operably connected to the frontal curtain airbag for inflating and deploying the frontal curtain airbag from the stored condition to the deployed condition.

According to another aspect, alone or in combination with any other aspect, a vehicle safety system can comprise the airbag module and an airbag controller. The airbag controller can be operatively connected to the inflator and configured to actuate the inflator in response to sensing the occurrence of an event for which occupant protection is desired.

According to another aspect, alone or in combination with any other aspect, a vehicle safety system can comprise a first and second airbag modules. The first airbag module can comprise a first apparatus and an inflator for inflating the frontal curtain airbag of the first airbag module. The second airbag module can comprise a second apparatus and an inflator for inflating the frontal curtain airbag of the second airbag module. The vehicle safety system can further comprise at least one airbag controller. The airbag controller can be operatively connected to the inflators and configured to actuate the inflators in response to sensing the occurrence of an event for which occupant protection is desired.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
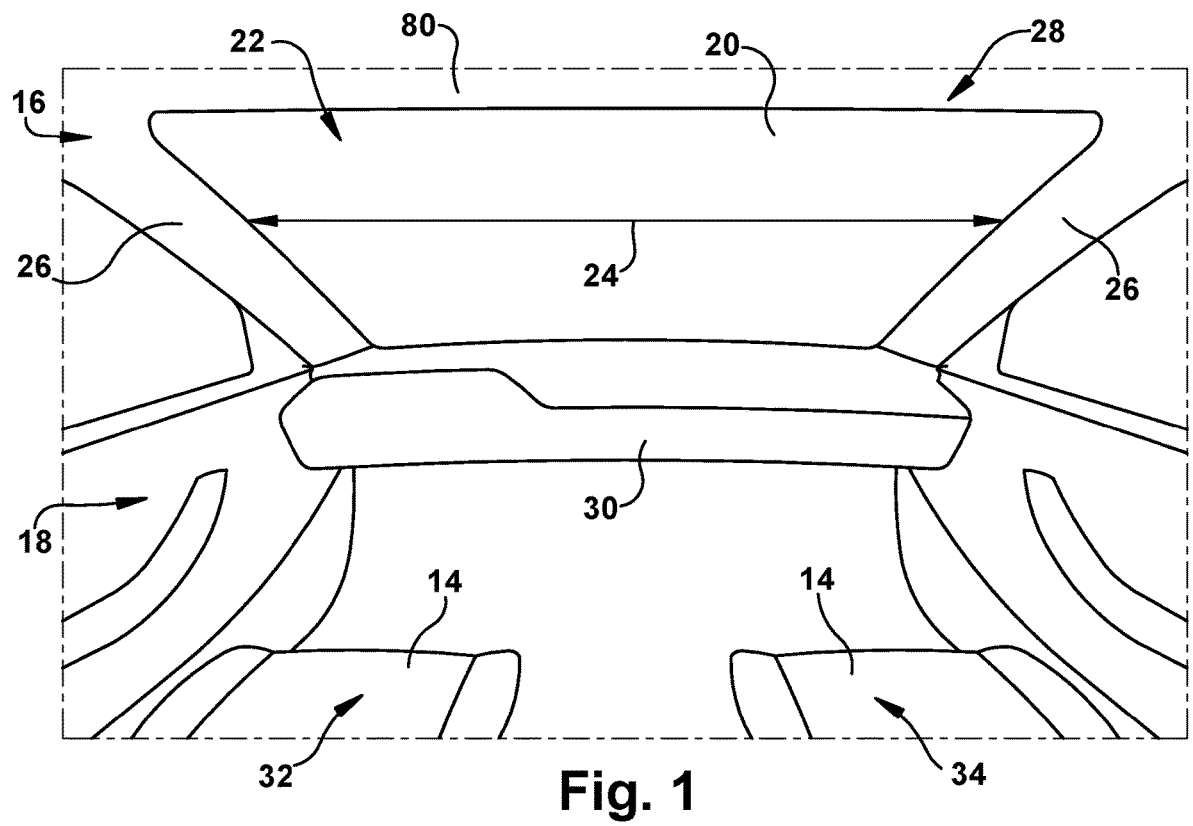
FIG. 1 is a forward-looking view of a passenger compartment of a vehicle having an apparatus for helping to protect an occupant of the vehicle in a first condition.

FIG. 1 depicts a forward-looking view of a passenger compartment 18 of a vehicle 16. The vehicle 16 includes a front windshield 20 in a windshield opening 22. The windshield 20 extends widthwise between two A-pillars 26, and heightwise between a vehicle roof 28 and an instrument panel 30. Typically, vehicles include a driver side frontal airbag for protecting a driver side, front seat vehicle occupant and a passenger side frontal airbag for protecting a passenger side, front seat vehicle occupant. The driver and passenger side frontal airbags are typically stored in and deploy from the instrument panel or from a structure, such as a steering wheel, adjacent to the instrument panel. Known frontal airbags thus rely on the instrument panel and instrument panel-adjacent structures for providing a storage location and a reaction surface for occupant protection and ejection mitigation in the event of a frontal crash.

In certain vehicle configurations, such as in driverless, autonomous, semi-autonomous, automated, and/or semi-automated vehicles, the instrument panel may be designed in a manner that reduces its functionality as an airbag storage location and/or as a reaction surface. In such vehicle configurations, it may be desirable to store the frontal airbags in a different location within the vehicle. For example, it may be desirable to store the frontal airbags adjacent the roof of the vehicle so that the frontal airbags may deploy downward from the roof of the vehicle to cover at least a portion of the windshield opening, while at least the windshield provides a reaction surface for the deployed frontal airbags. Conventional frontal airbags, however, are not configured to deploy from the roof downward. Further, conventional frontal airbags may not be designed to adequately cover the width of windshield opening when deploying from the roof. Modifying a known frontal airbag to span the width of the windshield opening would increase an inflatable volume of the frontal airbag. With a greater inflatable volume, the modified frontal airbag would require more inflation fluid and take longer to deploy.

Side curtain airbags are known in the art and are designed to be fixed to the roof of a vehicle and/or to a support structure adjacent to the roof of the vehicle. Side curtain airbags are configured to inflate from the roof of the vehicle downward inside the passenger compartment in the event of a side impact or a vehicle rollover. Although side curtain airbags are designed to deploy from the roof, and may have a length for providing appropriate widthwise coverage of the windshield opening, side curtain airbags are not designed to be used as frontal airbags. In particular, known side curtain airbags, if used as frontal airbags, would not have an appropriate airbag depth for protecting front seat vehicle occupants in the event of a frontal crash. Modifying a known side curtain airbag to span the width of the windshield opening and provide the appropriate airbag depth for protecting front occupants would increase an inflatable volume of the side curtain airbag. With a greater inflatable volume, the modified side curtain airbag would require more inflation fluid and take longer to deploy. Therefore, there are competing values when designing a frontal airbag that deploys from the vehicle roof to cover the windshield opening: width coverage, airbag depth, and deployment time. The apparatus 10 of the present disclosure is designed with these competing values in mind.

As shown in FIGS. 1-5, the apparatus 10 includes an inflatable vehicle occupant protection device 12 in the form of an airbag, such as a frontal curtain airbag, for helping to protect occupants seated in front vehicle seats 14 in the event of a frontal impact to the vehicle 16. In the embodiment illustrated in FIGS. 2 and 4, the frontal curtain airbag 12 is shown spanning across the width 24 of the windshield opening 22. The airbag 12 is thus on a driver side 32 of the vehicle 16 for helping to protect a vehicle occupant seated in a driver side front seat 14, and on a passenger side 34 of the vehicle for helping to protect a vehicle occupant seated in a passenger side front seat 14. Those skilled in the art will appreciate that the apparatus 10 disclosed herein could be adapted for protecting a driver side vehicle occupant, a passenger side vehicle occupant, or occupants of rearward rows of the vehicle 16, such as a $2^{nd}$ row, $3^{rd}$ row, etc., of the vehicle (not shown). Further, those skilled in the art will appreciate that the apparatus 10 disclosed herein can be used to help protect front row occupants of occupant-driven, driverless, autonomous, semi-autonomous, automated, and/or semi-automated vehicles.

As shown in the example configuration of FIGS. 1-5, the frontal curtain airbag 12 is constructed in a similar manner to that of known side curtain airbags. In particular, the frontal curtain airbag 12 includes panels 36, 38 of material that are arranged in an overlying manner. Overlapping portions of the panels 36, 38 are interconnected along at least a portion of a perimeter 40 of the airbag 12 to form a perimeter connection 42. The perimeter connection 42 is a non-inflatable portion of the airbag 12 that helps define an inflatable volume 44 of the airbag. The airbag 12 can also include interior connections 46 in which the overlying panels 36, 38 are interconnected, such as, for example, by stitching or interior tethers, within the perimeter 40 to form non-inflatable portions. The interior connections 46 and perimeter connection 42 together help define inflatable chambers 48 of the airbag 12.

The frontal curtain airbag 12 can be constructed of any suitable material, such as nylon (e.g., woven nylon 6-6 yarns), and can be constructed in any suitable manner. For example, the airbag 12 may have a one-piece woven construction in which the overlying panels 36, 38 are woven simultaneously as a single piece of material. As another example, the overlying panels 36, 38 can be formed from separate pieces of material. If the panels 36, 38 are formed from separate pieces of material, the panels can be interconnected by known means, such as stitching, ultrasonic welding, heat bonding, or adhesives, to form the airbag 12. The airbag 12 can be uncoated, coated with a material, such as a gas impermeable urethane, or laminated with a material, such as a gas impermeable film. The airbag 12 thus can have a gas-tight or substantially gas-tight construction. Those skilled in the art will appreciate that alternative materials, such as polyester yarn, and alternatives coatings, such as silicone, can also be used to construct the airbag 12.

Figure 3:
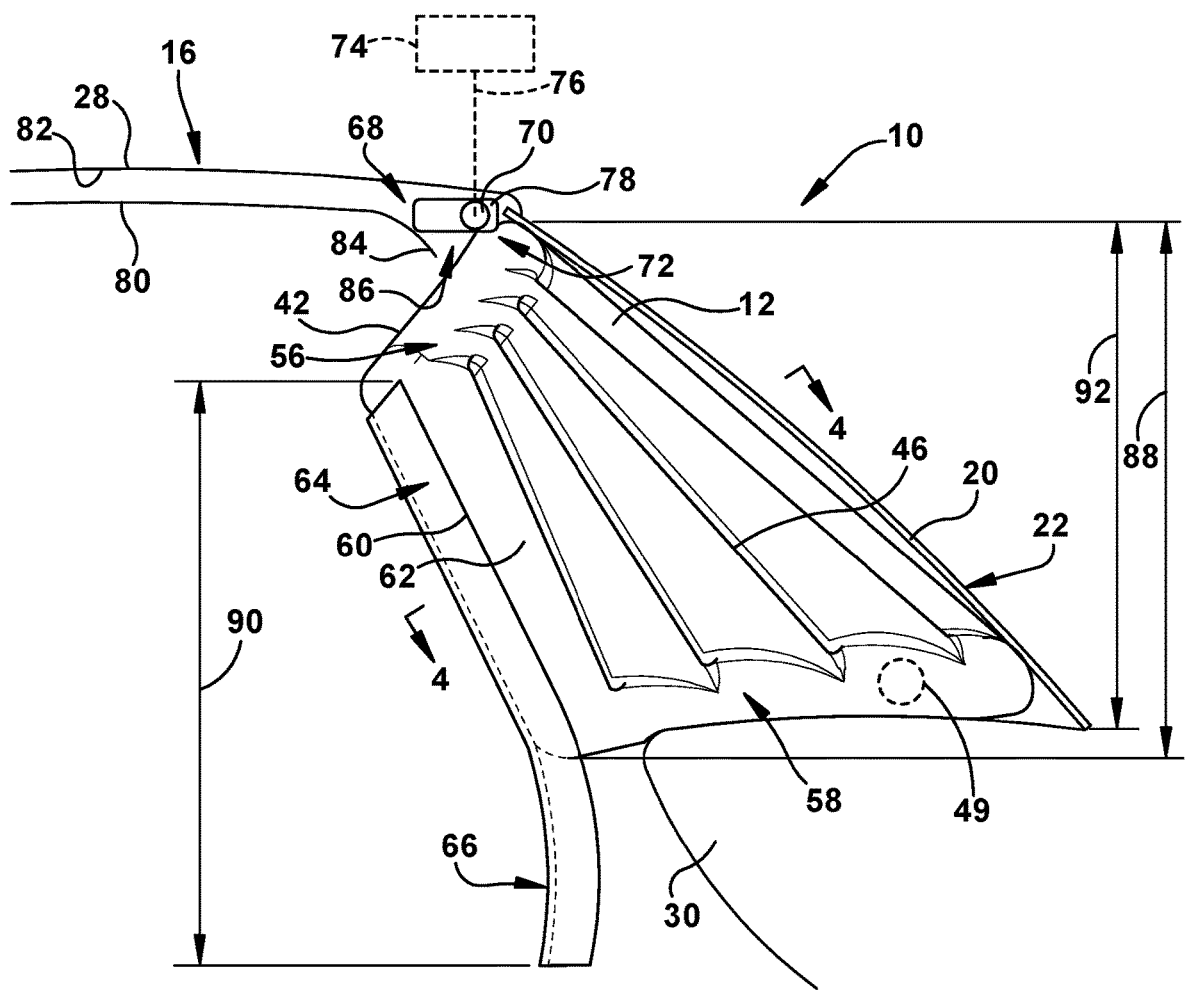
FIG. 3 is a schematic side view illustrating the apparatus of FIG. 2 in the second condition.

As shown in FIG. 3, the frontal curtain airbag 12 can include a vent 49 in one or both of the panels 36, 38 for releasing inflation fluid from the inflatable volume 44. The vent 49 can be selectively actuated in order to help control or tailor inflation of the airbag 12 in response to vehicle conditions, occupant conditions, or both. The vent 49 can be actuatable actively, for example, in response to conditions determined via active sensors, or passively, for example, having a configuration responsive to physical conditions at the time of inflation. For example, the vent 49 can comprise, or comprise a modified version of, the active vent disclosed in U.S. Pat. No. 10,730,472 to Perez, the subject matter of which is incorporated herein by reference. Alternatively, the vent 49 can be a passive vent that always vents inflation fluid. For example, the vent 49 can comprise, or comprise a modified version of, the passive vent disclosed in U.S. Pat. No. 10,730,472. The airbag 12 can also be ventless.

The apparatus 10 also includes a restraining panel 50 that is separate from and extends widthwise over the panels 36, 38 of the frontal curtain airbag 12. The restraining panel 50 can be constructed of any suitable material, such as the same material as the airbag 12 or a different material, and can be constructed in any suitable manner. A first end portion 52 of the restraining panel 50 is connected by known means, such as stitching, ultrasonic welding, heat bonding, or adhesives, to a first end portion 54 of the airbag 12. For example, the first end portion 52 of the restraining panel 50 may be sewn to the perimeter connection 42 at the first end portion 54 of the airbag 12 and from an upper portion 56 of the airbag to a lower portion 58 of the airbag. A second end portion 60 of the restraining panel 50 is connected by known means to a second end portion 62 of the airbag 12. For example, the second end portion 60 of the restraining panel 50 may be sewn to the perimeter connection 42 at the second end portion 62 of the airbag 12 and from the upper portion 56 to the lower portion 58. The first and second end portions 52, 60 of the restraining panel 50 are spaced widthwise across the restraining panel. The first and second end portions 54, 62 of the airbag 12 are spaced widthwise across the airbag.

Figure 2:
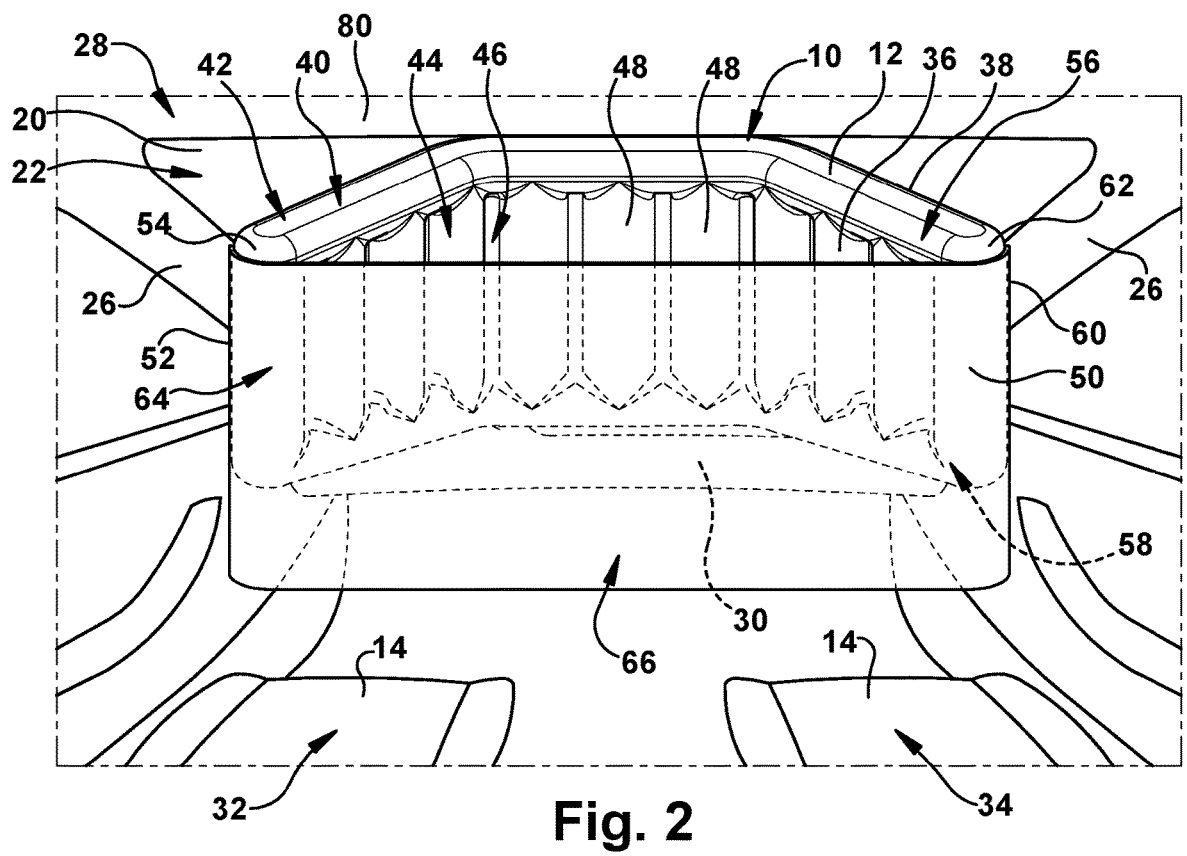
FIG. 2 is a forward-looking view of the passenger compartment illustrating the apparatus in a second condition, including a portion of the apparatus in a first configuration.

As shown in the example configuration of FIGS. 2-3, the restraining panel 50 can have upper and lower portions 64, 66. The upper portion 64 can be connected to the frontal curtain airbag 12 at the first and second end portions 52, 60 of the restraining panel 50. The lower portion 66 of the restraining panel 50 extends below the upper portion 64. In the example configuration of FIGS. 2-3, the lower portion 66 of the restraining panel 50 is indirectly connected to the airbag 12 through the upper portion 64. Alternatively, the lower portion 66 may be directly connected to the airbag 12.

As shown in FIG. 3, the frontal curtain airbag 12 and attached restraining panel 50 can be a part of an airbag module 68 that includes an inflator 70 operably connected to the inflatable volume 44. As shown the example configuration of FIG. 3, the frontal curtain airbag 12 has an inflator mouth 72 in fluid communication with the inflatable volume 44. The inflator 70 can be connected to and/or received in the inflator mouth 72. The inflator 70 is actuatable to provide inflation fluid to the inflatable volume 44 to inflate and deploy the airbag 12. The inflator 70 can be of any known type, such as stored gas, solid propellant, augmented, or hybrid. An airbag controller 74 can be operatively connected to the inflator 70 via lead wires 76. The airbag controller 74 is configured to actuate the inflator 70 in response to sensing the occurrence of an event for which occupant protection is desired, such as a collision.

As shown in the example configuration of FIGS. 1-4, the airbag module 68 can be installed in the vehicle 16 as a unit. To install the airbag module 68 in the vehicle 16, the frontal curtain airbag 12 is deflated. The deflated airbag 12 is rolled and/or folded, such as by rolling and/or folding the lower portion 58 toward the upper portion 56. Because of the restraining panel's 50 connection to the airbag 12, at least a portion of the restraining panel is rolled and/or folded with the airbag so that a portion of the restraining panel is positioned within the rolls and/or folds of the rolled and/or folded airbag. Once the airbag 12 is rolled and/or folded, the airbag can be packaged. By "package" or "packaged," it is meant that the airbag 12 is maintained in the rolled and/or folded condition so that the airbag and certain associated components, such as the inflator 70, fill tubes, connectors, the restraining panel 50, etc., can be installed in the vehicle 16 as a unit. Reference to the "packaged frontal curtain airbag," "packaged airbag," "the airbag package," and/or the like means an airbag 12 that is maintained in the rolled and/or folded condition so that the airbag is in a ready-to-install condition.

Once the frontal curtain airbag 12 has been packaged, the inflator 70 can be connected to and/or received in the inflator mouth 72 of the airbag. The packaged airbag 12 and attached restraining panel 50 and inflator 70 can then be inserted in a housing 78 of the airbag module 68. The airbag 12 and the inflator 70 can be securely attached to one or more walls of the housing 78. The walls of the housing 78 can help keep the airbag 12 packaged and the inflator 70 attached to the airbag. The housing 78, the packaged airbag 12, the restraining panel 50, and the inflator 70 can then be installed in the vehicle 16 as a unit.

In the example configuration of FIGS. 1-3, the vehicle 16 includes a headliner 80 that extends adjacent to, but spaced apart from, an inner surface 82 of the vehicle roof 28. In a stored condition of the frontal curtain airbag 12, a terminal end 84 of the headliner 80 is in abutting engagement with one or more of the inner surface 82 of the vehicle roof 28, a trim piece connected to the vehicle roof, and a trim piece that is at an intersection between the vehicle roof and the windshield 20.

When installed in the vehicle 16, the housing 78 of the airbag module 68 can be mounted adjacent the vehicle roof 28 in any known manner. As shown in the example configuration of FIGS. 1-3, the frontal curtain airbag 12, when in the stored condition, is in the packaged condition, mounted to the vehicle roof 28 through the housing 78, and positioned between the headliner 80 and the vehicle roof. The inflator 70 can also be mounted to the vehicle roof 28 through the housing 78. The headliner 80 overlies the airbag module 68 and conceals the airbag module in the vehicle 16.

Those skilled in the art will recognize that the configuration of the vehicle structure, and thus the spatial and interconnecting relationships between the vehicle structure (i.e., the vehicle roof 28) and the windshield 20, headliner 80 and airbag module 68, may vary depending upon the particular design of the vehicle 16. Therefore, it will be appreciated that the vehicle structure illustrated in FIGS. 1-4 and the spatial and interconnecting relationships between the vehicle structure and the windshield 20, headliner 80, and the airbag module 68 is for illustrative purposes and may vary as desired.

As shown in the example configuration of FIGS. 1-4, upon the occurrence of an event for which occupant protection is desired, such as a frontal collision, the airbag controller 74 actuates the inflator 70 to provide inflation fluid to the inflatable volume 44 to inflate and deploy the frontal curtain airbag 12 from the stored condition to a deployed condition. The deploying airbag 12 deploys into the headliner 80. The terminal end 84 of the headliner 80 disengages under the deployment forces of the deploying airbag 12 from its attachment and creates an opening 86 through which the airbag 12 can pass into a passenger compartment 18 of the vehicle 16 to reach the deployed condition.

Figure 4:
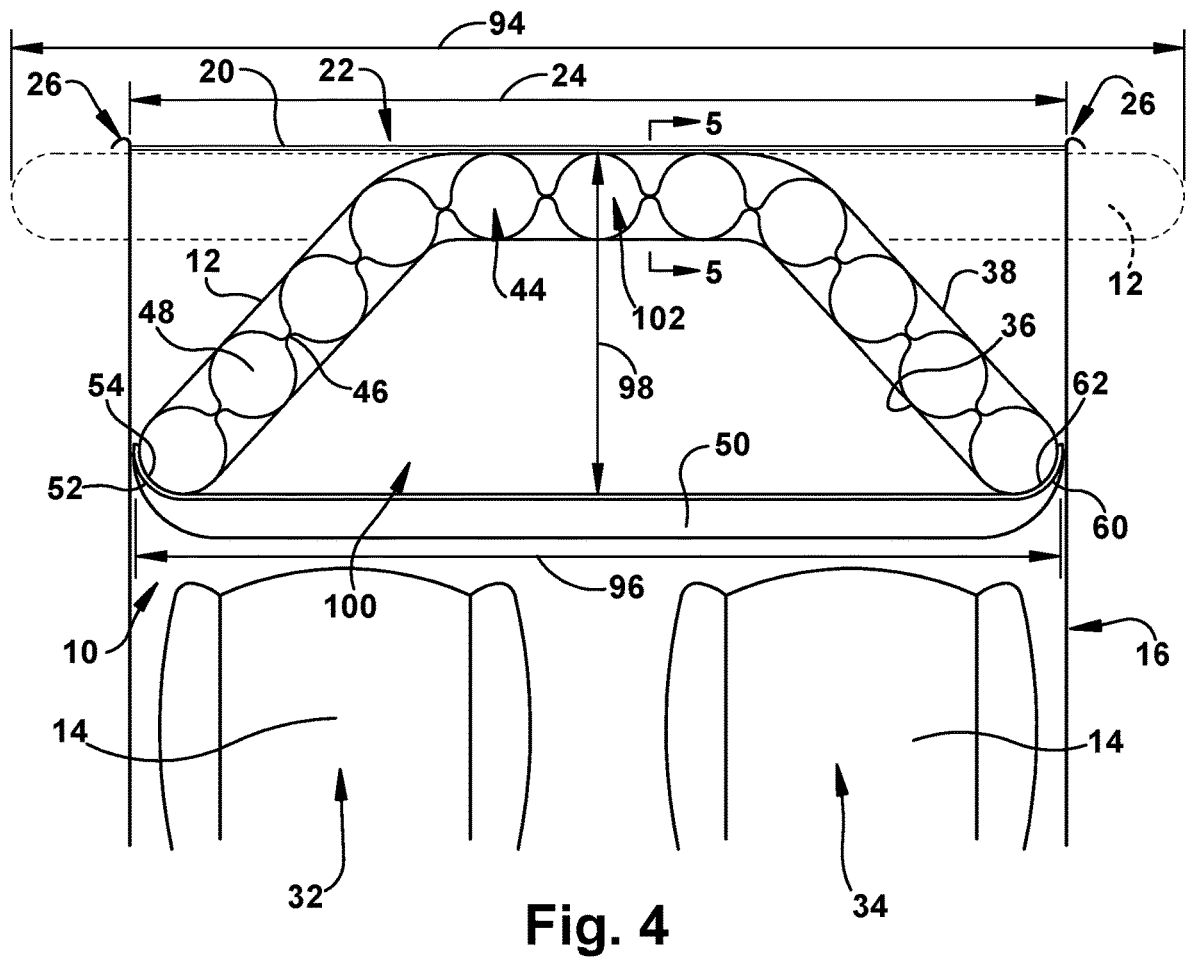
FIG. 4 is a schematic sectional top view taken along line 4-4 in FIG. 3.
Figure 5:
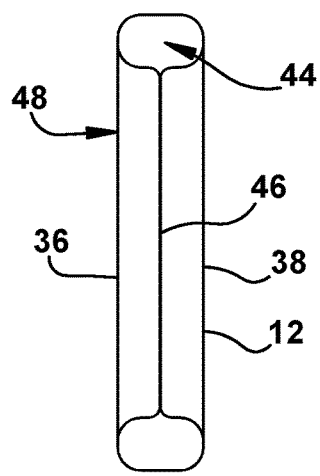
FIG. 5 is a schematic sectional side view of taken along line 5-5 in FIG. 4.

The deploying frontal curtain airbag 12 and attached restraining panel 50 deploys downward through the opening 86 and along the windshield 20 to the deployed condition. As shown in FIGS. 2-4, in the deployed condition, the airbag 12 and restraining panel 50 span across the width 24 of the windshield opening 22 from, for example, A-pillar 26 to A-pillar 26. Heights 88, 90 of the deployed airbag 12 and restraining panel 50 are configured to cover a height 92 of the windshield opening 22 and adjacent vehicle structures, such as the instrument panel 30, that are vertically below the windshield opening. As shown in FIG. 3, in the deployed condition, the windshield 20 can function as a primary reaction surface for the airbag 12, while the instrument panel 30 can function as a lesser, secondary reaction surface.

As can be seen in the example configuration in FIG. 4, the deployed frontal curtain airbag 12 in a flattened condition (i.e., a condition in which the deployed airbag is free from bends that reduce the width of the airbag) would have a width 94 that is greater than the width 24 of the windshield opening 22. The flattened airbag 12, if utilized on its own for frontal occupant protection, would thus provide adequate widthwise coverage of the windshield opening 22 and would be deployed in an appropriate amount of time. The flattened frontal current airbag 12, however, would not provide an adequate airbag depth for protecting occupants seated in the front vehicle seats 14. This same issue would be present if a conventional side curtain airbag was used for frontal occupant protection. Instead of increasing the inflatable volume 44 and extending the deployment time of the frontal curtain airbag 12, the apparatus 10 utilizes the restraining panel 50 to provide an appropriate airbag depth.

The restraining panel 50 has a width 96 that is less than the width 94 of the frontal curtain airbag 12 in the flattened condition. This width differential causes the opposing first and second end portions 54, 62 of the deployed airbag 12 to be bent toward one another and into a curved configuration. Pressurization in the deploying/deployed airbag 12 tensions the restraining panel 50 widthwise. The tensioned restraining panel 50 maintains the bend in the deploying/deployed airbag 12 so that an effective airbag depth 98 is measured between the restraining panel and the airbag. The apparatus 10 thus provides the effective airbag depth 98, which is at a depth that is configured to appropriately protect the occupants seated in the front vehicle seats 14, without having to increase the inflatable volume 44 and inflate a space 100 between the restraining panel 50 and airbag 12. The time and inflation fluid it takes to deploy the frontal curtain airbag 12 thus does not have to increase in order to provide the appropriate airbag depth.

Advantageously, the apparatus 10 provides a frontal airbag 12 that deploys from the vehicle roof 28 to cover the windshield opening 22 that appropriately covers the width 24 of the windshield opening, has an appropriate effective airbag depth 98, and deploys in a desirable amount of time.

As shown in the example configuration of FIG. 4, a central portion 102 of the deployed frontal curtain airbag 12, i.e., a portion of the airbag positioned centrally widthwise between the first and second end portions 54, 62 of the airbag, is positioned adjacent the windshield opening 22 and can abut the windshield 20. The first and second end portions 54, 62 are bent toward the occupants seated in the front vehicle seats 14 so that the restraining panel 50 is spaced from the windshield opening 22 by the airbag 12 and presented facing the occupants for occupant engagement. As shown in the example configuration of FIGS. 2-3, the lower portion 66 of the restraining panel 50 extends further downward than the lower portion 58 of the deployed airbag 12. The lower portion 64 of the restraining panel 50 can thus cover portions of the instrument panel 30 that are left uncovered by the deployed airbag 12. The lower portion 66 of the restraining panel 50 can "catch" a forward moving occupant to help prevent the occupant from impacting the instrument panel 30 and/or from sliding under the restraining panel.

FIGS. 6-12 depict other example configurations of the apparatus 10, 10a, 10b, 10c, 10d, 10e. The example configurations of the apparatus 10, 10a, 10b, 10c, 10d, 10e are not necessarily exclusive of each other. Those skilled in the art will appreciate that certain features can be shared and/or combined between the example configurations whether expressly stated, shown, or not. Structures of the example configurations depicted in FIGS. 6-12 that are the same as or similar to those described with reference to FIGS. 1-5 are either unnumbered or have the same reference numbers with the addition of an associated alphabetical mark. Description of common elements and operation similar to those in the previously described configuration may not be repeated with respect to the configurations of FIGS. 6-12, for brevity.

Figure 6:
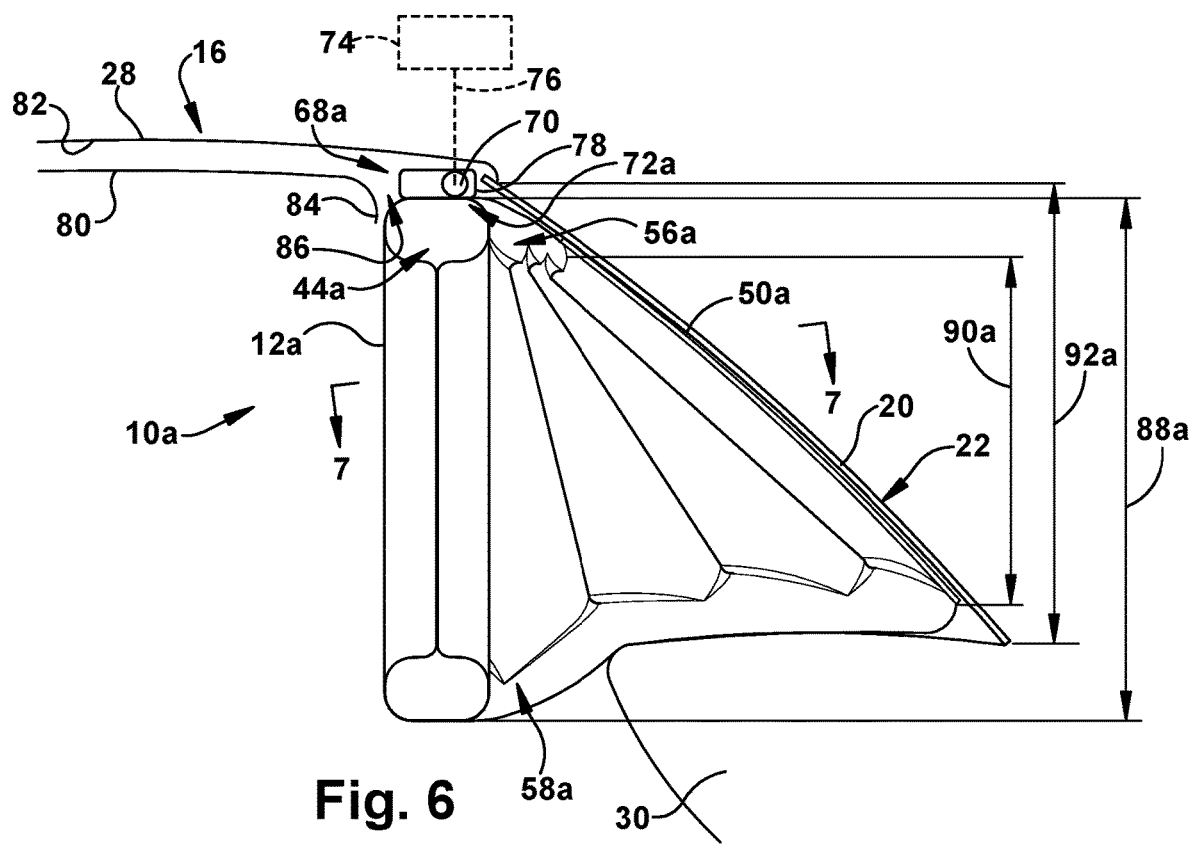
FIG. 6 is a schematic sectional side view illustrating the apparatus of FIG. 2 in the second condition, including a portion of the apparatus in a second configuration.
Figure 7:
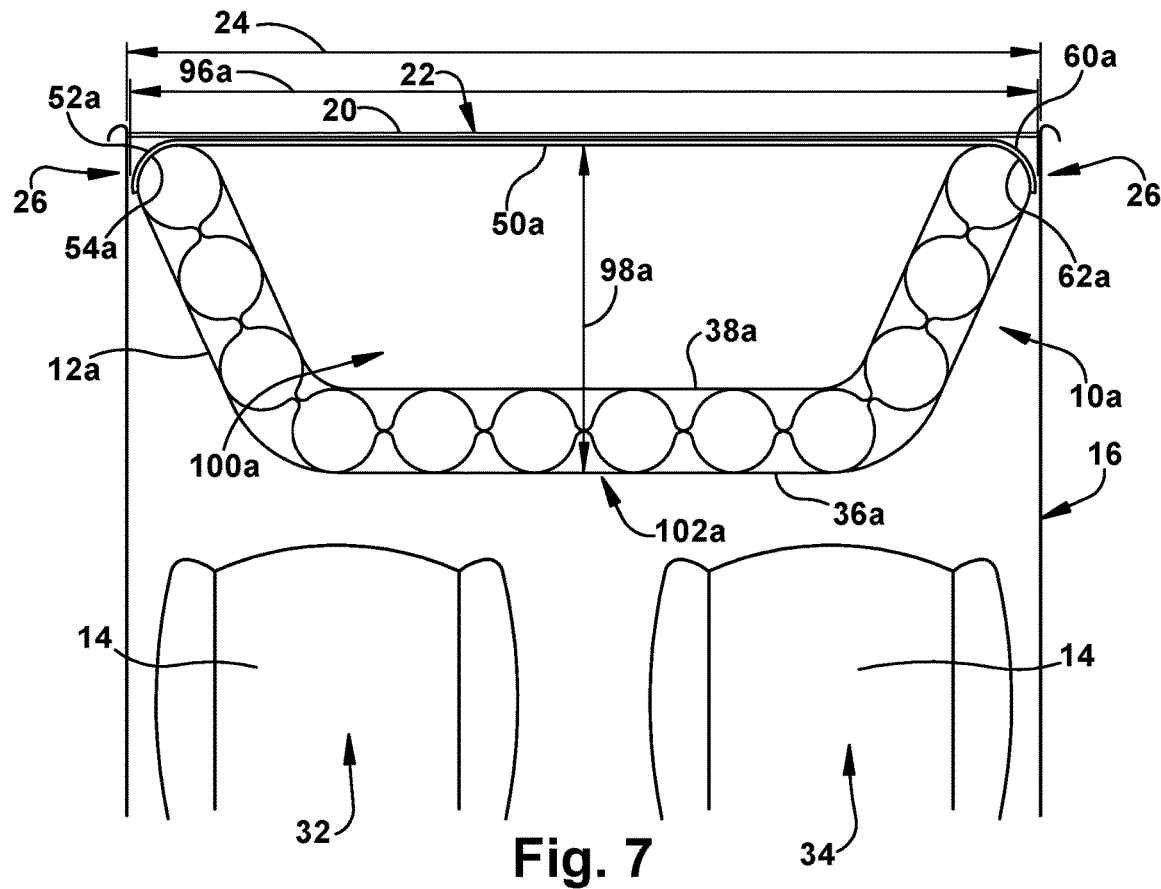
FIG. 7 is a schematic sectional top view taken along line 7-7 in FIG. 6.

The example configuration of the apparatus 10a shown in FIGS. 6-7 is substantially similar to the apparatus 10 of FIGS. 1-5, except that the first and second end portions 54a, 62a of the frontal curtain airbag 12a are bent toward the windshield 20. The restraining panel 50a thus is positioned adjacent the windshield 20, while the airbag 12a curves in a vehicle rearward direction away from the windshield opening 22 and toward the front seat occupants for occupant engagement. As shown in the example configuration of FIG. 6, the lower portion 58a of the airbag 12a can extend downward and cover a portion of the instrument panel 30. The lower portion 58a of the airbag 12a can thus "catch" a forward moving occupant to help prevent the occupant from impacting the instrument panel 30 and/or from sliding under the airbag.

Figure 8:
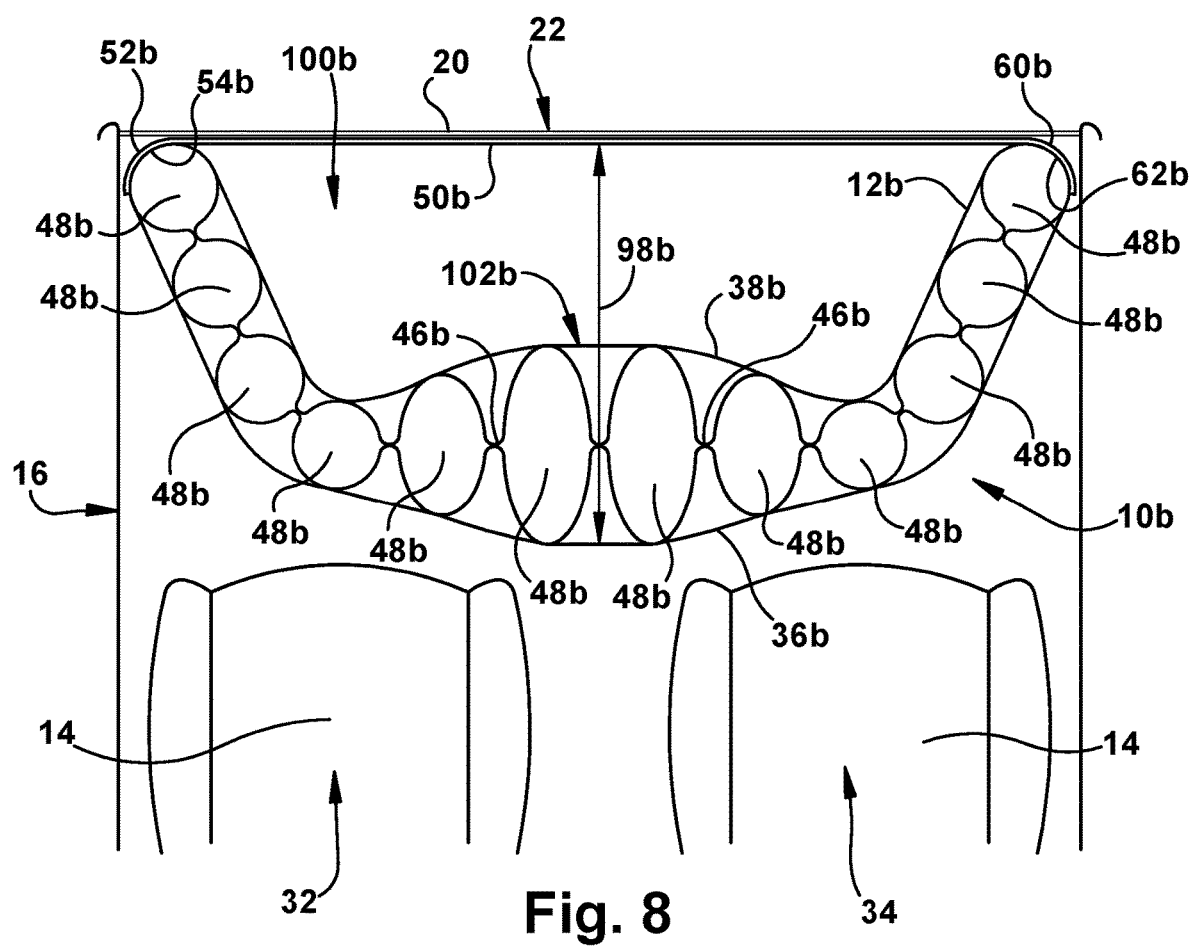
FIG. 8 is a schematic sectional top view illustrating a portion of the apparatus of FIG. 2 in the second condition, including a portion of the apparatus in a third configuration.

The example configuration of the apparatus 10b shown in FIG. 8 is substantially similar to the apparatus 10a of FIGS. 6-7, except that the inflatable chambers 48b of the frontal curtain airbag 12b vary in size. As shown in the example configuration of FIG. 8, the inflatable chambers 48b near the central portion 102b of the airbag 12b can be larger than the inflatable chambers spaced further away from the central portion. The larger inflatable chambers 48b can be configured to provide additional support for protecting the occupants seated in the front vehicle seats 14.

The interior geometry of the frontal curtain airbag 12b can be selected or adjusted to configure the sizes of the inflatable chambers 48b. For example, the sizes of the inflatable chambers 48b can be adjusted/selected by adjusting/selecting the widths of the inflatable chambers. The sizes of the inflatable chambers 48b can also be adjusted/selected by adjusting/selecting the depths of inflatable chambers between the overlying panels 36b, 38b. Additionally, the number of the interior connections 46b and the heights, widths, and depths of the interior connections can be manipulated to configure the sizes of the inflatable chambers 48b as desired.

The interior geometry of the frontal curtain airbag 12b can also be configured using known means so that certain inflatable chambers 48b inflate ahead of other inflatable chambers. For example, the interior connections 46b, such as the heights of the interior connections, can be configured so that the larger, centrally positioned inflatable chambers 48b inflate ahead of the smaller inflatable chambers.

Those skilled in the art will recognize that the interior geometry of the frontal curtain airbag 12b and the configuration of the inflatable chambers 48b may vary depending upon the particular design of the vehicle 16 and/or the desired occupant protection configuration. Therefore, it will be appreciated that the interior geometry of the airbag 12b and the configuration of the inflatable chambers 48b in FIG. 8 is for illustrative purposes and may vary as desired.

Figure 9:
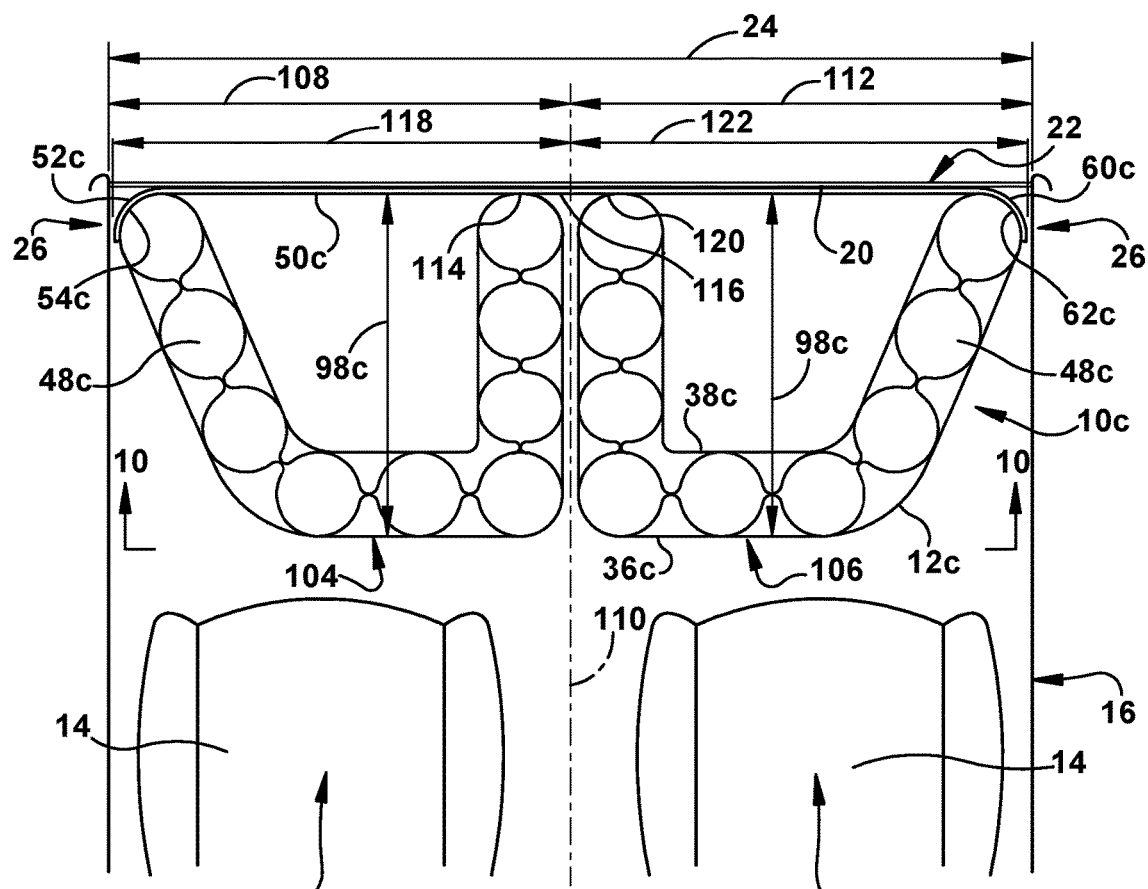
FIG. 9 is a schematic sectional top view illustrating a portion of the apparatus of FIG. 2 in the second condition, including a portion of the apparatus in a fourth configuration.
Figure 10:
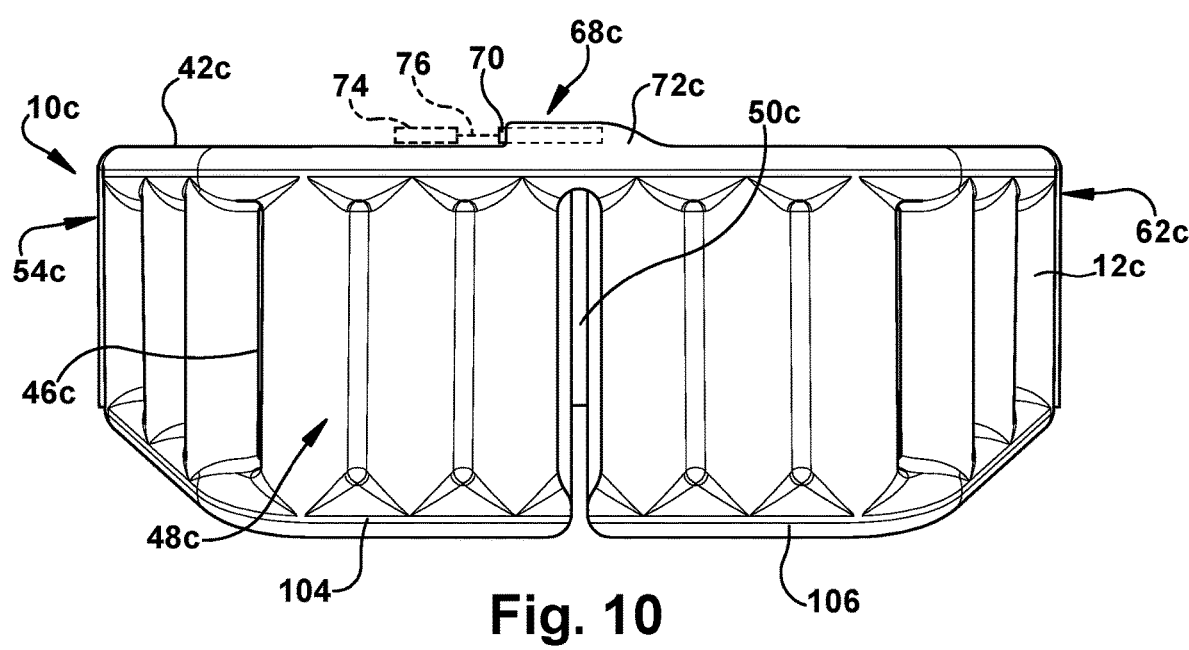
FIG. 10 is a schematic forward-looking view illustrating the apparatus of FIG. 9 in the second condition.

The example configuration of the apparatus 10c shown in FIGS. 9-10 is substantially similar to the apparatus 10a of FIGS. 6-7, except that the frontal curtain airbag 12c in FIGS. 9-10 includes a plurality of airbag portions 104, 106 each bent into a curved configuration. As shown in the example configuration of FIG. 9, the airbag 12c comprises a first airbag portion 104 comprising a plurality of inflatable chambers 48c that cover a first portion 108 of the width 24 of the windshield opening 22. The first portion 108 of the width 24 of the windshield opening 22 may span widthwise from one of the A-pillars 26, such as the driver side A-pillar, to a vehicle centerline 110. The airbag 12c also comprises a second airbag portion 106 comprising a plurality of chambers 48c that cover a second portion 112 of the windshield opening 22. The second portion 112 of the width 24 of the windshield opening 22 may span widthwise from one of the A-pillars 26, such as the passenger side A-pillar, to the vehicle centerline 110.

The first and second airbag portions 104, 106 can be fluidly connected to each other so that a single inflator 70 can be actuated to inflate both of the first and second airbag portions. The frontal curtain airbag 12c in the example configuration of FIG. 10 includes the first and second airbag portions 104, 106 being fluidly coupled to one another adjacent the inflator mouth 72c. The apparatus 10c can include additional inflators, a multi-stage inflator, and/or a fabric diffuser for inflating and guiding inflation fluid to each airbag portion 104, 106.

As shown in FIG. 9, a first end portion 54c of the first airbag portion 104 is connected to the first end portion 52c of the restraining panel 50c. An opposite, second end portion 114 of the first airbag portion 104 is connected to a central portion 116 of the restraining panel 50c. The central portion 116 of the restraining panel 50c is positioned centrally widthwise between the first and second end portions 52c, 60c of the restraining panel. A width 118 of the restraining panel 50c between the first end portion 52c and central portion 116 is configured to cause the first and second end portions 54c, 114 of the first airbag portion 104 to be bent toward one another and into a curved configuration when the frontal curtain airbag 12c is inflated and deployed.

Similarly, a first end portion 120 of the second airbag portion 106 is connected to the central portion 116 of the restraining panel 50c. The first end portion 120 of the second airbag portion 106 can be separated and spaced from the second end portion 114 of the first airbag portion 104 at the central portion 116 of the restraining panel 50c. An opposite, second end portion 62c of the second airbag portion 106 is connected to the second end portion 60c of the restraining panel 50c. A width 122 of the restraining panel 50c between the central portion 116 and the second end portion 60c is configured to cause the first and second end portions 120, 62c of the second airbag portion 106 to be bent toward one another and into a curved configuration when the frontal curtain airbag 12c is inflated and deployed.

Pressurization in the deploying/deployed first and second airbag portions 104, 106 tensions the restraining panel 50c widthwise. The tensioned restraining panel 50c maintains the bends in the first and second airbag portions 104, 106 so that the effective depths 98c of the first and second airbag portions are measured between the restraining panel and the first and second airbag portions. Although the apparatus 10c includes a single restraining panel 50c for bending each airbag portion 104, 106 into a curved configuration, each airbag portion can have its own separate restraining panel.

Figure 11:
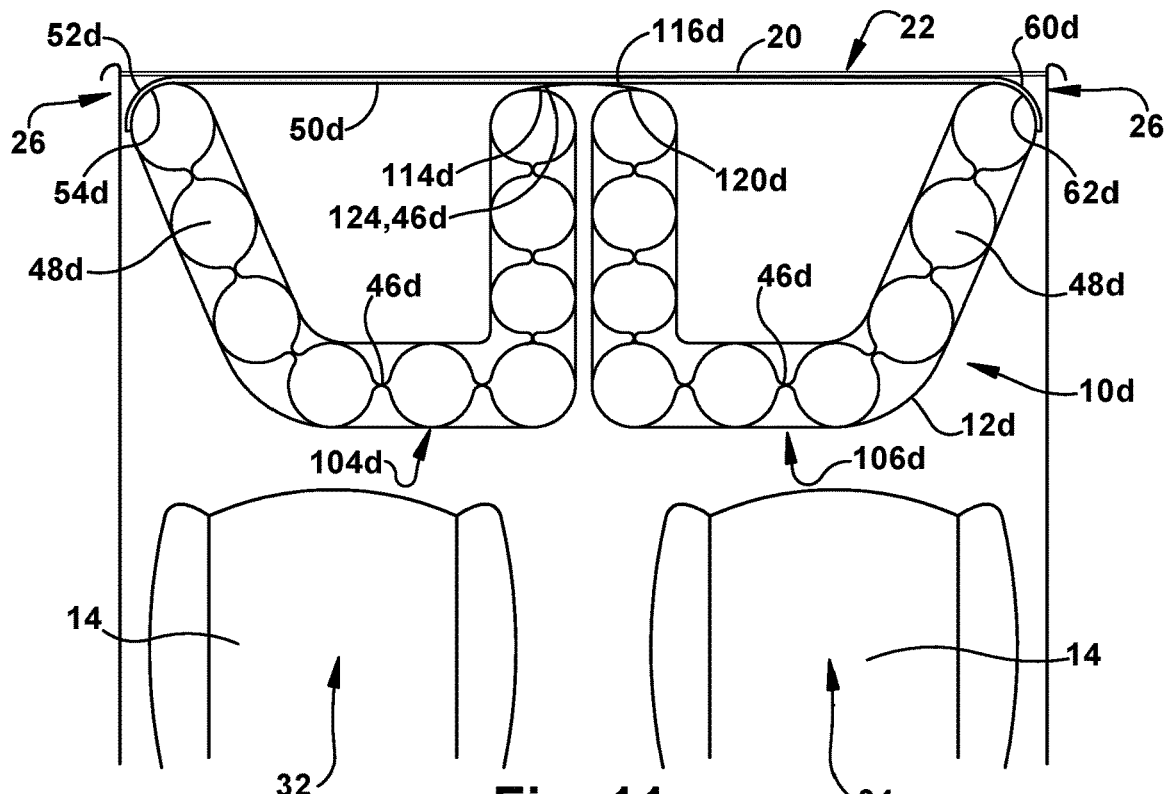
FIG. 11 is a schematic sectional top view illustrating a portion of the apparatus of FIG. 2 in the second condition, including a portion of the apparatus in a fifth configuration.

The example configuration of the apparatus 10d shown in FIG. 11 is substantially similar to the apparatus 10c of FIGS. 9-10, except that the second end portion 114d of the first airbag portion 104d is connected to the first end portion 120d of the second airbag portion 106d. As shown in the example configuration of FIG. 11, the second end portion 114d of the first airbag portion 104d and the first end portion 120d of the second airbag portion 106d can be connected to one another by an uninflated portion 124 of the frontal curtain airbag 12d. The uninflated portion 124 can be formed from one or more interior connections 46d. Each of the second end portion 114d of the first airbag portion 104d and the first end portion 120d of the second airbag portion 106d can be indirectly connected to the restraining panel through the uninflated portion 124. Alternatively, each of the second end portion 114d of the first airbag portion 104d and the first end portion 120d of the second airbag portion 106d can be directly connected to the restraining panel 50d regardless of whether the uninflated portion 124 is connected to the restraining panel.

Figure 12:
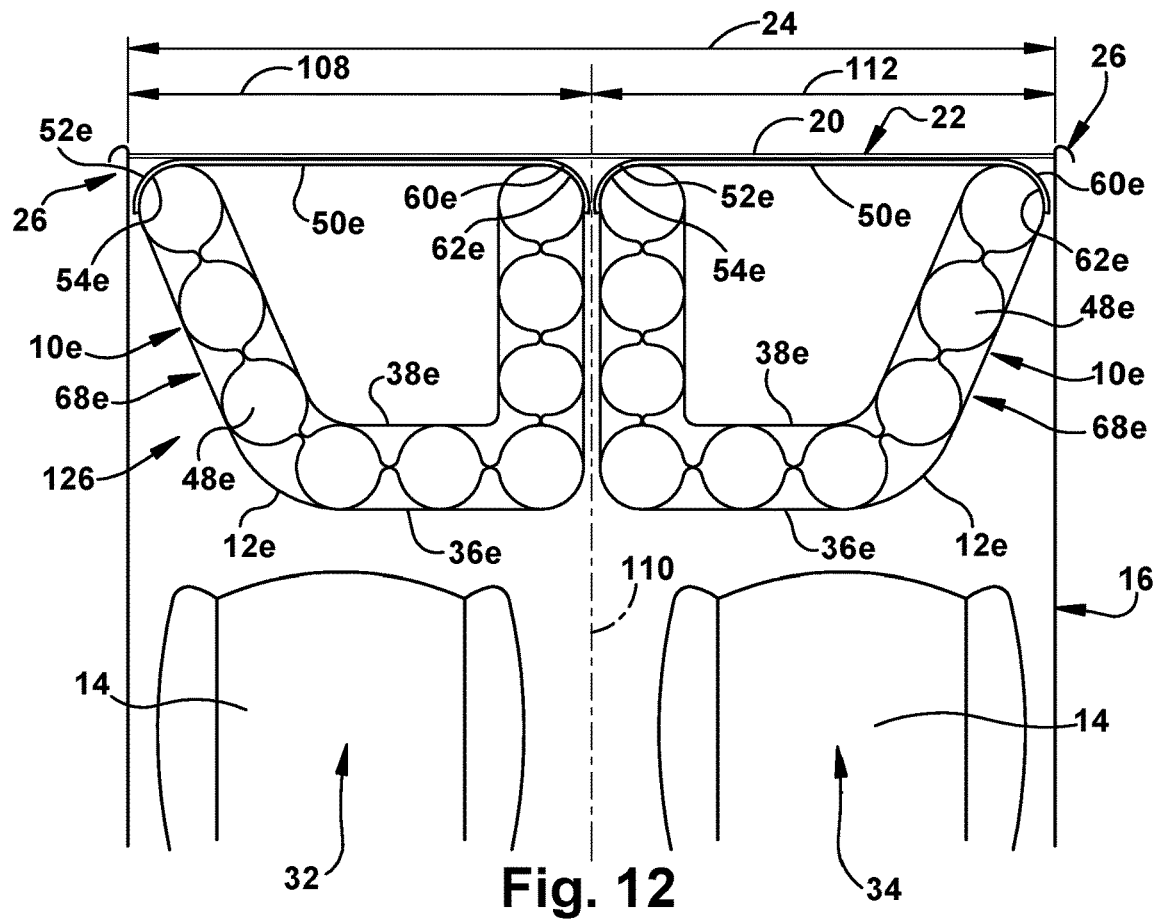
FIG. 12 is a schematic sectional top view illustrating the vehicle having two of the apparatus of FIG. 6 in the second condition.

The example configuration of the apparatus 10e shown in FIG. 12 is substantially similar to the apparatus 10a of FIGS. 6-7, except that apparatus 10e is adapted for protecting the driver side vehicle occupant or the passenger side vehicle occupant. FIG. 12 depicts a vehicle safety system 126 having an airbag controller 74e and two separate airbag modules 68e similar to the airbag controller 74 and airbag module 68 of FIGS. 1-5. Each airbag module 68e has its own inflator (not shown), frontal curtain airbag 12e, and restraining panel 50e. As shown in the example configuration of FIG. 12, each deployed airbag 12e and restraining panel 50e spans widthwise across and covers the first or second portion 108, 112 of the width 24 of the windshield opening 22. The vehicle safety system 126 thus has one airbag module 68e and apparatus 10e for protecting the frontal occupant on the driver side 32 of the vehicle 16, and one airbag module 68e and apparatus 10e for protecting the frontal occupant on the passenger side 34 of the vehicle. Although the vehicle safety system 126 is described and shown as having two airbag modules 68e and the apparatus 10e, the vehicle safety system can have any number of airbag modules and apparatus for protecting a driver side vehicle occupant, a passenger side vehicle occupant, and/or occupants of rearward rows of the vehicle 16.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, comprising:

a frontal curtain airbag having overlying panels interconnected to form a perimeter connection that extends along a perimeter of the panels and interior connections within the perimeter, the perimeter connection and the interior connections defining inflatable chambers of the frontal curtain airbag, the frontal curtain airbag being deployable from a stored condition adjacent a roof of the vehicle down to a deployed condition in which the frontal curtain airbag spans widthwise across a windshield opening of the vehicle; and a restraining panel separate from and extending widthwise over the panels of the frontal curtain airbag, the restraining panel being connected to the frontal curtain airbag and having a width configured to cause opposing end portions of the deployed frontal curtain airbag to be bent toward one another and into a curved configuration;

wherein pressurization in the deploying frontal curtain airbag tensions the restraining panel widthwise, the tensioned restraining panel maintaining the bend in the deploying frontal curtain airbag so that an effective airbag depth is measured between the restraining panel and the frontal curtain airbag, wherein the width of the restraining panel is less than a width of the frontal curtain airbag in a flattened condition, the width differential causing the opposing end portions of the deployed frontal curtain airbag to be bent toward one another and into the curved configuration, and wherein the width of the frontal curtain airbag in the flattened condition is greater than the width of the windshield opening.

2. The apparatus of claim 1, wherein heights of the restraining panel and the frontal curtain airbag are configured to cover a height of the windshield opening and adjacent vehicle structures that are vertically below the windshield opening.

3. The apparatus of claim 1, wherein in the deployed condition of the frontal curtain airbag, a central portion of the frontal curtain airbag is positioned adjacent the windshield opening, and the restraining panel is spaced from the windshield opening by the frontal curtain airbag and presented facing the occupant for occupant engagement.

4. The apparatus of claim 1, wherein in the deployed condition of the frontal curtain airbag, the restraining panel is positioned adjacent the windshield opening, and the frontal curtain airbag curves in a rearward direction away from the windshield opening toward the occupant for occupant engagement.

5. The apparatus of claim 1, wherein the inflatable chambers vary in size.

6. The apparatus of claim 1, wherein the frontal curtain airbag includes an active or passive vent for releasing inflation fluid from the frontal curtain airbag.

7. The apparatus of claim 1, wherein in the stored condition, the frontal curtain airbag is rolled and/or folded and positioned between the vehicle roof and a vehicle headliner.

8. An airbag module, comprising:
the apparatus recited in claim 1; and
an inflator operably connected to the frontal curtain airbag for inflating and deploying the frontal curtain airbag from the stored condition to the deployed condition.

9. A vehicle safety system comprising:
the airbag module recited in claim 8; and
an airbag controller operatively connected to the inflator and configured to actuate the inflator in response to sensing the occurrence of an event for which occupant protection is desired.

10. An apparatus for helping to protect an occupant of a vehicle, comprising:
a frontal curtain airbag having overlying panels interconnected to form a perimeter connection that extends along a perimeter of the panels and interior connections within the perimeter, the perimeter connection and the interior connections defining inflatable chambers of the frontal curtain airbag, the frontal curtain airbag being deployable from a stored condition adjacent a roof of the vehicle down to a deployed condition in which the frontal curtain airbag spans widthwise across a windshield opening of the vehicle; and
a restraining panel separate from and extending widthwise over the panels of the frontal curtain airbag, the restraining panel being connected to the frontal curtain airbag and having a width configured to cause opposing end portions of the deployed frontal curtain airbag to be bent toward one another and into a curved configuration;
wherein pressurization in the deploying frontal curtain airbag tensions the restraining panel widthwise, the tensioned restraining panel maintaining the bend in the deploying frontal curtain airbag so that an effective airbag depth is measured between the restraining panel and the frontal curtain airbag, wherein the restraining panel has an upper portion and a lower portion that extends below the upper portion, the lower portion of the restraining panel extending further downward than a lower portion of the frontal curtain airbag when the frontal curtain airbag is in the deployed condition.

11. An apparatus for helping to protect an occupant of a vehicle, comprising:
a frontal curtain airbag having overlying panels interconnected to form a perimeter connection that extends along a perimeter of the panels and interior connections within the perimeter, the perimeter connection and the interior connections defining inflatable chambers of the frontal curtain airbag, the frontal curtain airbag being deployable from a stored condition adjacent a roof of the vehicle down to a deployed condition in which the frontal curtain airbag spans widthwise across a windshield opening of the vehicle; and
a restraining panel separate from and extending widthwise over the panels of the frontal curtain airbag, the restraining panel being connected to the frontal curtain airbag and having a width configured to cause opposing end portions of the deployed frontal curtain airbag to be bent toward one another and into a curved configuration;
wherein pressurization in the deploying frontal curtain airbag tensions the restraining panel widthwise, the tensioned restraining panel maintaining the bend in the deploying frontal curtain airbag so that an effective airbag depth is measured between the restraining panel and the frontal curtain airbag, wherein the frontal curtain airbag and the restraining panel span widthwise from A-pillar to A-pillar to cover the windshield opening on both driver and passenger sides of the vehicle.

12. An apparatus for helping to protect an occupant of a vehicle, comprising:
a frontal curtain airbag having overlying panels interconnected to form a perimeter connection that extends along a perimeter of the panels and interior connections within the perimeter, the perimeter connection and the interior connections defining inflatable chambers of the frontal curtain airbag, the frontal curtain airbag being deployable from a stored condition adjacent a roof of the vehicle down to a deployed condition in which the frontal curtain airbag spans widthwise across a windshield opening of the vehicle; and
a restraining panel separate from and extending widthwise over the panels of the frontal curtain airbag, the restraining panel being connected to the frontal curtain airbag and having a width configured to cause opposing end portions of the deployed frontal curtain airbag to be bent toward one another and into a curved configuration;
wherein pressurization in the deploying frontal curtain airbag tensions the restraining panel widthwise, the tensioned restraining panel maintaining the bend in the deploying frontal curtain airbag so that an effective airbag depth is measured between the restraining panel and the frontal curtain airbag, wherein the restraining panel has first and second end portions spaced widthwise from one another and a central portion positioned centrally between the first and second end portions of the restraining panel;
wherein the frontal curtain airbag comprises a first airbag portion comprising a plurality of chambers that cover a first portion of the width of the windshield opening and a second airbag portion comprising a plurality of chambers that cover a second portion of the windshield opening, the first and second portions being fluidly connected to each other;

wherein the first airbag portion has a first end portion connected to the first end portion of the restraining panel and an opposite second end portion connected to the central portion of the restraining panel;

wherein the second airbag portion has a first end portion connected to the second end portion of the restraining panel and an opposite second end portion connected to the central portion of the restraining panel;

wherein the width of the restraining panel between the first end portion and the central portion is configured to cause the first and second end portions of the first airbag portion to be bent toward one another and into a curved configuration when the frontal curtain airbag is inflated and deployed; and wherein the width of the restraining panel between the second end portion and the central portion is configured to cause the first and second end portions of the second airbag portion to be bent toward one another and into a curved configuration when the frontal curtain airbag is inflated and deployed.

13. The apparatus of claim 12, wherein pressurization of the first and second airbag portions tensions the restraining panel widthwise, the tensioned restraining panel maintaining the bends in the first and airbag portions so that the effective depth of the first and second airbag portions is measured between the restraining panel and the first and second airbag portions.

14. The apparatus of claim 12, wherein the second end portion of the first airbag portion is separated and spaced from the first end portion of the second airbag portion.

15. The apparatus of claim 12, wherein the second end portion of the first airbag portion is connected to the first end portion of the second end portion by an uninflated portion of the frontal curtain airbag.

16. An airbag module, comprising:
the apparatus recited in claim 12; and
an inflator operably connected to both the first and second airbag portions for inflating and deploying the first and second airbag portions from the stored condition to the deployed condition.

* * * * *